United States Patent [19]

Kamiya et al.

[11] Patent Number: 4,694,348
[45] Date of Patent: Sep. 15, 1987

[54] METHOD OF DRIVING LIQUID CRYSTAL DISPLAY PANEL OF TV RECEIVER

[75] Inventors: Kiyoshi Kamiya; Atsushi Shiraishi, both of Tokorozawa; Fuminori Suzuki, Tanashi, all of Japan

[73] Assignee: Citizen Watch Co., Ltd., Tokyo, Japan

[21] Appl. No.: 872,333

[22] Filed: Jun. 9, 1986

[30] Foreign Application Priority Data

Jun. 14, 1985 [JP] Japan ............................ 60-129689
Aug. 30, 1985 [JP] Japan ............................ 60-191755

[51] Int. Cl.$^4$ ............................................. H04N 3/14
[52] U.S. Cl. ............................... 358/236; 358/140; 358/241
[58] Field of Search ............... 358/230, 236, 241, 166, 358/152, 140; 340/752, 784, 794

[56] References Cited

U.S. PATENT DOCUMENTS

| | | | |
|---|---|---|---|
| 3,938,136 | 2/1976 | Kawakami | 340/324 M |
| 3,970,776 | 7/1976 | Kinuhata | 358/140 |
| 4,057,835 | 11/1977 | Kinuhata | 358/140 |
| 4,251,835 | 2/1981 | Eriksen | 358/152 |
| 4,393,405 | 7/1983 | Ikeda | 358/153 |
| 4,602,292 | 7/1986 | Togashi | 358/236 |

OTHER PUBLICATIONS

High Quality Television by Signal Processing, by Broader Wendland, Second International Conference on New Systems and Services in Telecommunication, Nov. 1983.

Primary Examiner—Tommy P. Chin
Attorney, Agent, or Firm—Jordan and Hamburg

[57] ABSTRACT

A method of driving a liquid crystal display panel of a TV receiver whereby of each set of six scanning lines consisting of three successive lines of one field and three corresponding lines of the succeeding field, three lines are displayed by display elements driven by one scanning electrode and the remaining three lines by display elements driven by an immediately adjacent scanning electrode. One of the three lines to be displayed by the action of each electrode may be omitted. An increase in display resolution of approximately 4/3 is attained, by comparison with a simple prior art drive method.

4 Claims, 15 Drawing Figures

METHOD OF DRIVING LIQUID CRYSTAL DISPLAY PANEL OF TV RECEIVER

BACKGROUND OF THE INVENTION

A liquid crystal display panel used in a television receiver (referred to in the following as a liquid crystal TV display) includes a matrix array of horizontally oriented scanning electrodes and vertically oriented signal electrodes, the signal electrodes and scanning electrodes being disposed on mutually opposing substrates of the liquid crystal display panel. Selection signals are successively applied to the scanning electrodes, while stepwise modulated signals are applied to the signal electrodes, to display a television picture. Each scanning electrode is selected during a single selection interval, with a relatively lange amplitude voltage being applied to the selected electrode. At the same time, signals at a relatively small amplitude voltage level, stepwise modulated in accordance with the video data contents, are applied to all of the signal electrodes. As a result, picture elements disposed between the selected scanning electrode and the opposing signal electrodes are driven into the display state. Since with a liquid crystal display panel it is necessary to apply the modulated drive signals simultaneously to all of the signal electrodes during each selection interval, the composite video TV signal must be sampled prior to selection of each scanning electrode and the resultant sample signals then subjected to A/D conversion. In this way, stepwise-varying modulation data required during at least one selection interval is generated and stored immediately prior to that interval. Generally speaking, each selection interval usually corresponds to one horizontal scanning interval (designated in the following as 1H). However, depending upon the scanning method employed it is possible for each selection interval to correspond to 2H. Sampling operations are usually performed during each selection interval to generate modulation data which will be required during the succeeding selection interval. Display of a complete TV picture is accomplished by successive selection of all of the scanning electrodes in this way.

When an NTSC format image is displayed by such a liquid crystal TV display, each frame consists of two fields, where one field consists of 262.5 scanning lines. However due to the time interval required for the vertically flyback and:for the correct display region the effective number of scanning lines is approximately 220. In the case of a liquid crystal TV display, interlace of the first and second fields is generally not performed, and identical selection operations are carried out for each field in a frame. Furthermore, due to the characteristics of liquid crystal material obtainable at the present time, it is only possible to obtain an acceptable value of contrast ratio if the matrix drive time-sharing factor is limited such that the number of scanning lines is held to slightly more than 100. Various methods have been proposed to lower the effective value of this time-sharing factor, to provide a display having 220 scanning lines in each field. One such method uses duplex matrix driving, whereby each scanning electrode has a width equal to two picture elements, with two signal electrode drive systems being employed (i.e. making the number of signal electrodes equal to twice the number of rows of picture elements). In this way, the stepwise video modulation signals can be applied to two scanning electrodes simultaneously during each selection interval. This enables a display having 220 scanning lines to be provided, by using only 110 scanning electrodes. Another method of lowering the effective time-sharing factor is the upper/lower split-display method, in which the display panel is divided into two parts, i.e an upper and a lower display section. In this way the scanning electrodes and signal electrodes are respectively divided into two sets of electrodes in the upper and lower display sections. Thus, driving a display of this type which has 220 scanning lines is equivalent to driving a conventional display having 110 scanning lines.

The duplex method described above has the disadvantage that the electrode patterns are complex, resulting in a lowering of the manufacturing yield for such a display panel, and hence increased cost. In addition, due to the fact that connecting leads must be positioned between pairs of adjacent picture elements, the ratio of the area of the picture elements to the total display area image quality. In the case of the upper/lower split-display method on the other hand it is difficult to suitably configure the electrodes at the boundary region between the upper and lower display sections, causing a lowering of manufacturing yield. Furthermore, the number of integrated circuits necessary for display drive operation is increased, with this method, resulting in increased cost of manufacture. In addition, differences between the images produced by the upper and lower display sections can occur, leading to a lowering of image quality. Because of the various problems described above, the only practical method of driving a liquid crystal TV display in use at present is to simply reduce the number of rows of picture elements by half, i.e. to employ only 110 rows of picture elements, by comparison with the capability of the duplex drive method or the split-display method described above which can enable 220 rows of picture elements to be driven.

In the following, a horizontally aligned row of picture elements will be referred to as a horizontal picture element line, for precision of description. With the duplex matrix drive method described above, two scanning lines are produced over each horizontal picture element line line, as compared with non-duplex operation in which each horizontal picture element line line corresponds to one scanning line. With the simple 110-row drive method, every seconc scanning line of the total 220 lines is subjected to A-D conversion to produce stepwise-modulated video data, i.e. a total of 110 lines are converted. It is also possible to perform A-D conversion of all of the 220 scanning lines, with such a simple non duplex display drive method, but in either case only 110 scanning lines are actually displayed. As a result, with such a display technique not only is there a loss of display resolution, by comparison with the basic capability of the TV signal (440 scanning lines per frame), but in addition the resolution is further reduced by one-half due to the fact that interlace scanning is not utilized, in addition to the lowered resolution resulting from the use of only one line of each successive pair of scanning lines during each field (i.e. each pair of scanning lines being displayed by one row of picture elements). Thus the 440 scanning lines per frame of the TV signal are displayed such that four lines are averaged into one scanning line, with a total of only 110 scanning lines per frame being displayed.

FIG. 1 is a diagram showing a prior art arrangement of drive electrodes for a liquid crystal TV display having n×m picture elements, in which $T_{11}$ to $T_{n1}$ denote n scanning electrodes, and $S_1$ to $S_m$ are m signal electrodes. As described above, n is approximately 110. FIG. 2 is a timing chart showing the waveforms of the composite video signal and the selection signals applied to the scanning electrodes, for the 110-row liquid crystal TV display of FIG. 1. In FIG. 2, VIDEO denotes the television composite video signal, with portions of two successive fields being shown. CL denotes a signal which determines the timings of selection of the scanning electrodes. A signal produced by pulse-width modulation of signal CL in accordance with the video data is applied to drive the signal electrodes.

TP1, TP2 and TP3 denote selection signals which are applied to the scanning electrodes $T_{11}$, $T_{21}$, $T_{31}$, shown in FIG. 1, and are of positive polarity at certain timings and negative polarity at other timings, i.e. the polarity which is midway between the maximum positive and negative potentials of these signals is the non-selection potential and selection of a scanning electrode occurs when one of signals TP1, TP2, . . . is set to the positive or negative potential value thereof. As shown in FIG. 2, the selection signals applied to mutually adjacent scanning electrodes are of opposite polarity, and the polarity of the selection potential applied to each scanning electrode alternates in successive fields, to apply AC drive to the liquid crystal display panel.

As described above, with prior art scanning methods it has only been possible to produce an NTSC standard television image using a liquid crystal TV display, having either of two basic numbers of scanning electrodes, i.e. approximately 220 or 110 electrodes. This is due to the fact that the number of output terminals available from an integrated circuit chip employed for a scanning electrode drive circuit is only approximately 110, while in addition the characteristics of presently available liquid crystal material are such that satisfactory display contrast can only be obtained in practice with a drive time-sharing factor of slightly more than 100. However problems arise with regard to poor display quality if the number of scanning electrodes is limited to approximately 110, and this loss of quality is especially noticeable when characters of diagrams are displayed, since the displayed image appears extremely rough. In the case of a liquid crystal display panel having 220 scanning electrodes, the duplex drive method can be employed to hold the drive time-sharing factor to that of a 110-line display, without reduction of display contrast. Alternatively, two integrated circuits can be employed to drive two sets of drive electrodes, by the split-display method described above. However in either case problems including increased manufacturing cost will arise.

It is an objective of the present invention to overcome the problems described above, to provide an improved method of driving a liquid crystal TV display, which provides both high display quality and low manufacturing cost.

SUMMARY OF THE INVENTION

The present invention provides a method of driving a liquid crystal display panel of a television receiver having a plurality of scanning line electrodes, for displaying data of a composite video signal, whereby of 3 successive scanning lines of a first field and 3 successive scanning lines of a second field which coincide with or are displaced by one scanning line pitch from the 3 scanning lines of the first field in one frame of the composite video signal, 3 lines thereof are displayed by liquid crystal display elements driven by a first one of the scanning electrodes and the remaining three lines thereof are displayed by liquid crystal display elements driven by a second one of the scanning electrodes.

DESCRIPTION OF THE PREFERRED EMBODIMENTS

Figure 1:
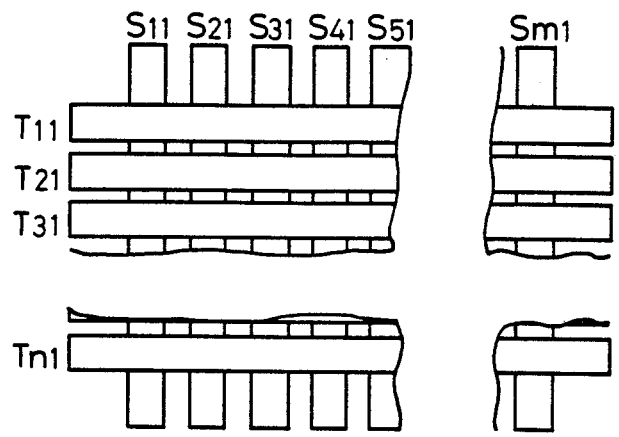
FIG. 1 is a partial plan view to illustrate an arrangement of drive electrodes of a liquid crystal TV display.
Figure 2:
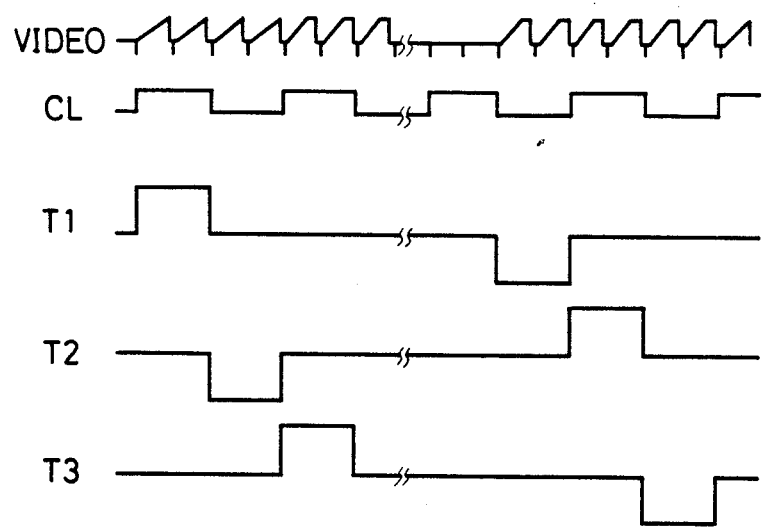
FIG. 2 is a timing chart for assistance in describing a prior art method of driving a liquid crystal TV display.
Figure 3:
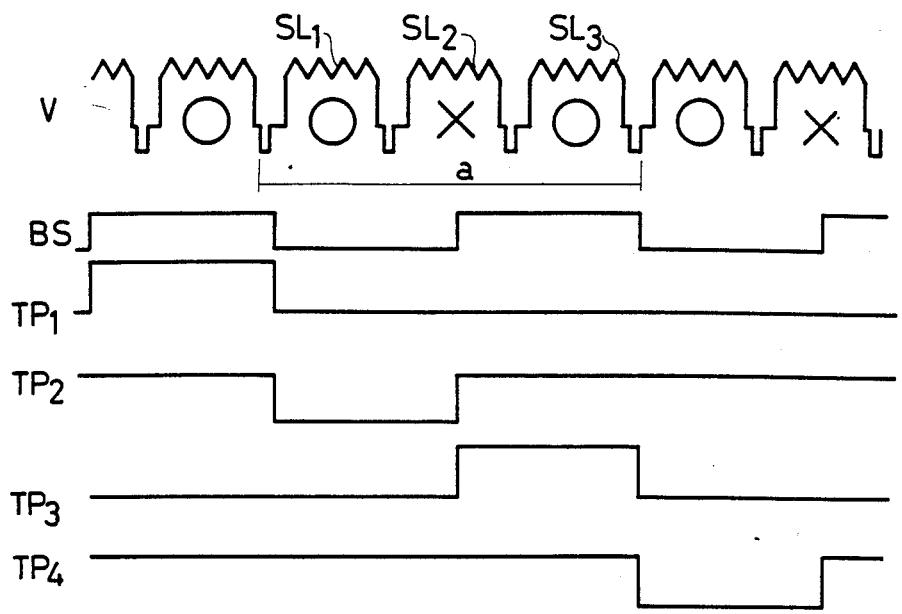
FIGS. 3(A) and 3(B) are waveform diagrams for assistance in describing a first embodiment of a drive method according to the present invention.
Figure 3:
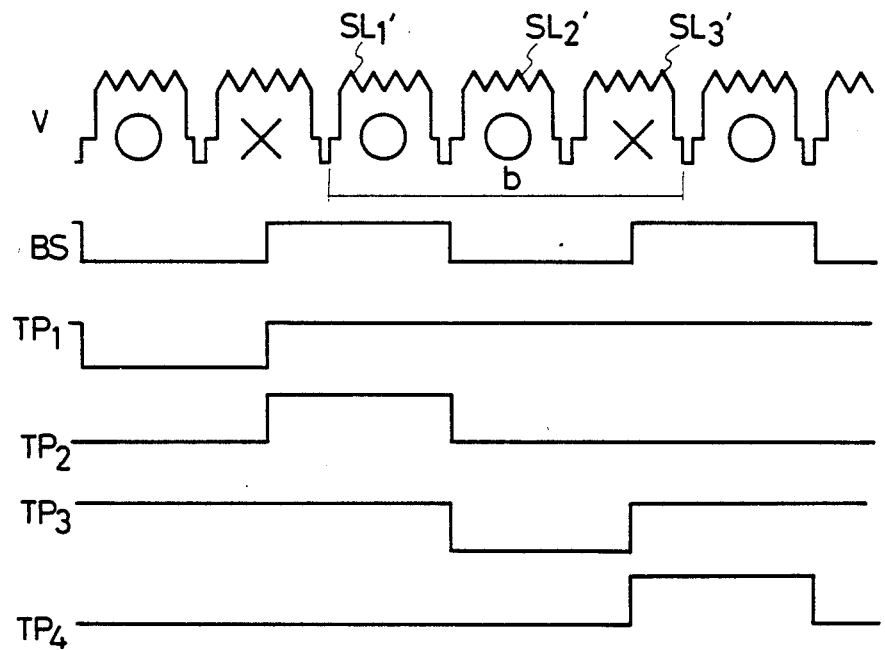

FIG. 3(A), 3(B) show timing charts for assistance in describing a first embodiment of a drive method according to the present invention, as applied to an interlace format television signal. FIGS. 3(A) and 3(B) respectively illustrate signals produced during a first and a second fields respectively, which occur successively within one frame interval. V denotes a composite video signal, BS denotes a base signal, which controls the timing of driving the scanning electrodes. TP1, TP2, TP3, TP4, . . . denote tri-state signals which are applied to respective scanning electrodes of the display. Each of signals TP1, TP2, TP3, TP4, . . . consists of positive and negative-going pulses which vary about a central potential, whereby these pulses successively select respective scanning electrodes. The latter central potential is identical to a central potential of drive signals which are applied to the signal electrodes of the display panel. TP1, TP2, TP3 and TP4 will be referred to in the following simply as timing pulses, and it will be assumed that the scanning lines of the composite video signal are for an interlace display, i.e. are based on a vertical sync signal which produces interlace with a separation of ½ scanning line pitch between scanning lines of successive fields. In FIGS. 3(A), 3(B), those scanning lines which are actually displayed by this embodiment are indicated by a circle symbol, while scanning lines which are omitted from the display are indicated by an "X", i.e. the video data for these scanning lines is not applied to the signal electrodes of the display panel. The letters "a"

and "b" respectively denote two sets of three successive scanning lines, i.e. the lines 10 designated as SL1, SL2 and SL3 in the first field (FIG. 3(A)), and SL1', SL2' and SL3' in the second field (FIG. 3(B)), which are displayed by the action of two scanning electrodes. It will be assumed in the following for ease of description that the sets of scanning lines "a" and "b" respectively correspond to the first, second and third scanning lines of the first and second fields of a frame interval. The base signal BS has a period of 3H and a duty ratio of 50%. As shown, those scanning lines during which the rising edge of signal BS coincides with the brightness signal component of the composite video signal V (indicated by the "X" symbol) are omitted from the display. In this way the second scanning line (SL2) of the first field and the third scanning line (SL3') of the second field are omitted.

Figure 4:
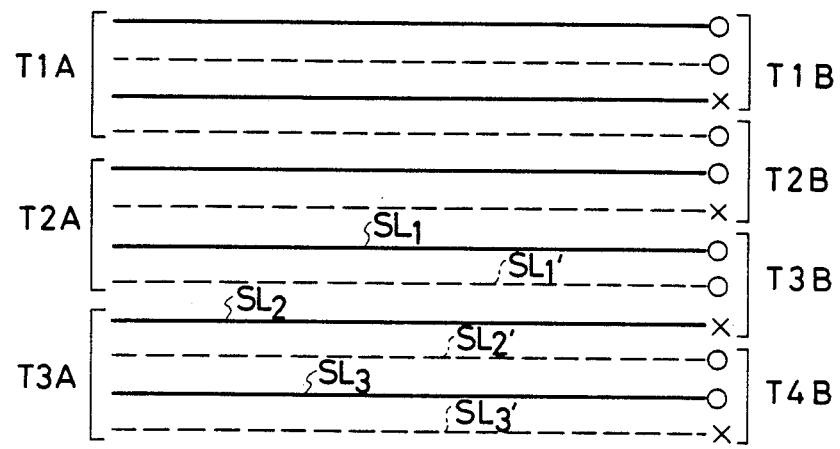
FIG. 4 is a diagram for illustrating relationships between scanning electrodes and associated scanning lines, for comparing the drive method of the present invention with a prior art drive method.

The operation of this embodiment will be compared with a prior art drive method in which each scanning electrode acts to display 4 scanning lines, referring to FIG. 4. In FIG. 4, T1A through T3A denote three successively adjacent scanning electrodes for the case of such a prior art drive method. The horizontal full-line portions denote scanning lines of a first field (e.g. that of FIG. 3(A)) while the broken-line portions denote scanning lines of a second field (e.g. that of FIG. 3(B)). As indicated, four scanning lines are displayed by the action of each of the scanning electrodes T1A through T3A, i.e. two scanning lines in one field and two scanning lines of the succeeding field of a frame are displayed by each row of liquid crystal display elements which is driven by these scanning electrodes. T1B through T4B denote four successively adjacent scanning lines of a liquid crystal TV display which are driven by the first embodiment of the invention described above with reference to FIGS. 3(A), 3(B). In FIG. 4, the "O" and "X" symbols indicate scanning lines which are respectively displayed and omitted from the display, as in FIGS. 3(A), 3(B). For ease of description it will be assumed that, as indicated, the set of scanning lines SL1 through SL3 in FIG. 3A and SL1' through SL3' in FIG. 3B correspond to the identically designated scanning lines shown in FIG. 4. In this case, the scanning lines SL1 of the first field is displayed over scanning electrode T3B, i.e. is displayed by the liquid crystal display elements driven by scanning electrode T3B. The succeeding scanning line SL2 of that first field is omitted. The next scanning lines SL3 of the first field is then displayed by scanning electrode T4B. During the second field of the frame, scanning line SL1' is displayed over scanning electrode T3B. The next scanning line, SL2' of the second field, is displayed over scanning electrode T4B. The third scanning line of the second field, SL3', is omitted.

It can thus be understood that with this embodiment of the present invention, of a total of six scanning lines consisting of three scanning lines of a first field and three scanning lines of a second field which respectively correspond to the first-mentioned three scanning lines (i.e. which overlap or are respectively displaced by one scanning line pitch on the TV image), two scanning lines are displayed by the action of a first scanning electrode, while another two scanning lines are displayed by the action of a second scanning electrode. More specifically, an odd-numbered scanning line of one field and a corresponding odd-numbered scanning line of the immediately succeeding field are displayed by the action of a first scanning electrode, with the succeeding even-numbered scanning lines of the first field being omitted, while an even-numbered scanning line of the second field (corresponding to the latter-mentioned omitted scanning line) and the next odd numbered scanning line of the first field are displayed by the action of a second scanning electrode adjacent to the first scanning electrode, while a succeeding odd-numbered scanning line of the second field is omitted.

Alternatively, it can be considered that each of the scanning electrodes T1B through T4B is driven by selection timing pulses at timings which correspond to the application to the signal electrodes of video data for three scanning lines (one scanning line of one out of two successive fields, and two scanning lines of the other field), but with the display of video data for one of these three scanning lines being omitted. It can thus be understood that this method involves a form of sampling of successive scanning lines, whereby during each field, only one of each pair of successive scanning lines is selected to be displayed.

This embodiment of the present invention provides a very substantial improvement in resolution by comparison with the simple prior art method described hereinabove in which four scanning lines are displayed by driving one scanning electrode, i.e. enabling a television image to be produced by 150 rows of liquid crystal display elements, as compared with the prior art drive method whereby only 110 rows are employed. The present invention thereby provides an increase in display resolution by a factor of 4/3 times, by comparison with that prior art drive method.

In addition, the odd and even-numbered scanning lines are evenly distributed over the display area when the method of the present invention is employed, providing a more natural appearance of the displayed image.

Figure 5:
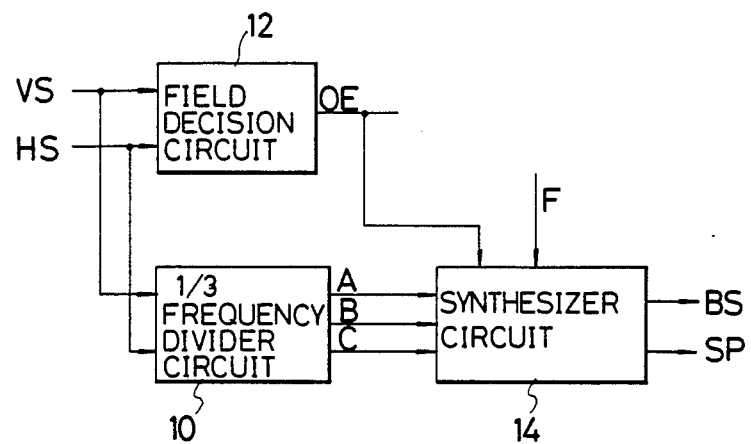
FIG. 5 is a general block diagram of a circuit for generating a base signal employed in the method of FIG. 3.

FIG. 5 is a block circuit diagram for illustrating an example of a circuit for generating the signal BS referred to above. VS denotes a vertical sync signal component and HS is a horizontal sync signal having a duty ratio of 50%, which is derived from the horizontal sync component of the composite video signal. Numeral 10 denotes a ⅓ frequency divider circuit which receives the signals VS and HS as inputs (together with reset and clock signals, not shown in the drawing) and produces as outputs the 3-phase clock signals A, B and C respectively. Numeral 12 denotes a field decision circuit, which determines whether each field is the first or the second field of a frame interval, based on the phase difference between the HS and VS signals, and produces as output a field decision signal OE. Numeral 14 denotes a synthesizer circuit which receives as inputs the output signals A, B, C and OE from ⅓ frequency divider circuit 10 and the field decision circuit 12, and also a field inversion signal F, and which synthesizes these signals to produce the base signal BS and also a signal SP which determines the sampling period for sampling the video data to produce video drive signals.

Figure 6:
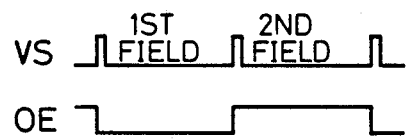
FIG. 6 is a timing chart for use in describing the embodiment of FIG. 5.

FIG. 6 is a timing chart showing the waveform of the output signal OE from field decision circuit 12 in FIG. 5. As shown, signal OE 12 is at a low logic level during a first field of a frame interval, and at a high logic level during the second field of the frame interval.

Figure 7:
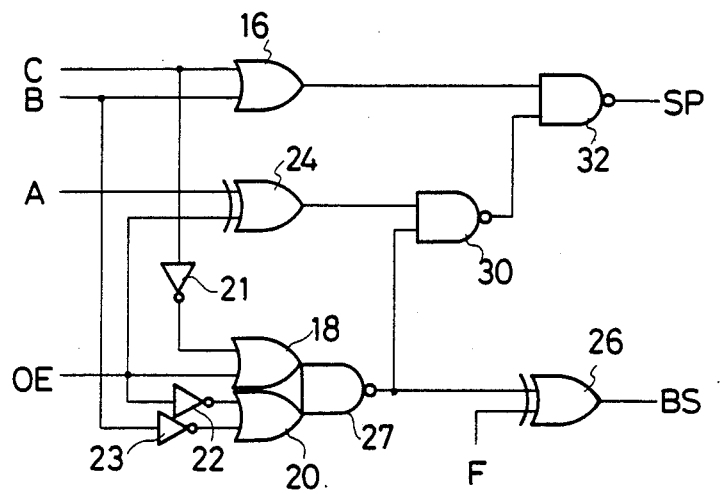
FIG. 7 is a circuit diagram of a signal synthesizing circuit in the circuit of FIG. 7.
Figure 8A:
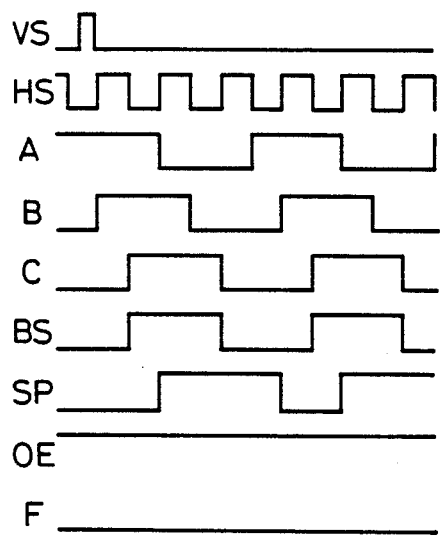
FIG. 8(A) and 8(B) are waveform diagrams for assistance in describing the operation of the circuit of FIG. 7.
Figure 8B:
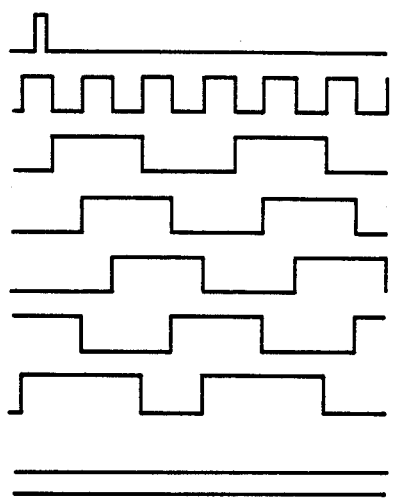

FIG. 7 is a circuit diagram of a specific example of the synthesizing circuit 14 shown in FIG. 5. In FIG. 7, signals corresponding to those of FIG. 5 are indicated by corresponding reference designations. Numerals 16, 18 and 20 denote OR gates, 21, 22 and 23 denote inverters, 24 and 26 denote exclusive-OR gates. Numerals 27, 30 and 32 denote NAND gates. FIG. 8(A), 8(B) are timing diagrams for illustrating the operation of the synthesizing circuit 14 shown in FIG. 5, in which signals corresponding to those of FIG. 5 are indicated by corresponding reference designations. FIGS. 8(A), 8(B) respectively correspond to the first and second fields of a frame interval, which will be assumed to respectively correspond to the fields shown in FIGS. 3(A), 3(B) and described hereinabove. During the first field, shown in FIG. 8(A), the vertical sync pulse VS occurs at a timing when the horizontal sync signal HS is at the low logic level, while during the second field (in FIG. 8(B)) the vertical sync pulse VS occurs when signal HS is at the high level. This fact enables discrimination between the first and second fields of a frame interval in an interlace scanning video signal, with the first and second fields being respectively indicated by signal OE going to the high and the low logic levels, as shown in FIGS. 8(A), 8(B) The rising edges of the horizontal sync signal HS (which has a 50% duty ratio as stated above) occur at points which are close in time to the rising edges of the horizontal sync signal component of the composite video signal. In this embodiment the base signal BS is synthesized by selecting the B and C outputs from the ⅓ frequency divider circuit 10. Specifically, during the first field, signal C is selected to produce signal BS, while during the second signal the inverse of signal B (inverted in accordance with the field inversion signal F) is selected to produce signal BS. Sampling of the scanning lines in the video data is performed when signal SP is at the high logic level, i.e. each scanning line which occurs when signal SP is at the low level is omitted from the display.

If this embodiment were to be applied to a non-interlace video signal, the field decision signal OE would be held fixed at the low logic level, to thereby ensure that AC drive is applied to the liquid crystal TV display. In this case, the first, second and third scanning lines of the first field of a frame interval will be respectively superimposed on the first, second and third scanning lines of the second field of that frame interval. Thus, only the first and third scanning lines of the first field will be displayed, and the first and second scanning lines of the second field. The first scanning electrode therefore serves to display the first scanning line of each field, while the second scanning electrode serves to display the second and third scanning lines of each first and second field respectively. This ensures a highly uniform display quality.

A second embodiment of a drive method according to the present invention will now be described, referring first to the timing charts of FIGS. 9(A) to 9(D). FIGS. 9(A) and 9(B) respectively illustrate a first and a second field of a frame interval, while FIGS. 9(C) and 9(D) respectively illustrate the first and second fields of an immediately succeeding frame interval. For brevity of description, the fields of FIGS. 9(C) and 9(D) will be referred to as the third and fourth fields respectively. HS denotes a horizontal sync sync signal, and BS' a base signal, which controls the durations of successive selection timing pulses. T1 through T4 are selection timing pulses applied to the first, second, third and fourth scanning electrodes respectively, as for the first embodiment described above. $S_n$ denotes a selection signal voltage which is applied to the nth signal electrode, and which varies about a central potential that is identical to the central potential of the selection timing pulses T1 through T4 applied to the scanning electrodes. As with the first embodiment, the signal electrode voltage is pulse-width modulated, going to either a high or a low level with respect to the central potential described above, in accordance with the video display contents.

As shown in FIG. 9(A), during a first field a timing pulse of positive polarity is applied to the first scanning electrode for the duration of two horizontal scanning intervals (2H). An effective drive voltage is thereby applied to the corresponding liquid crystal display element due to the voltage difference between the timing pulse level and the pulse-width modulated voltage applied to the signal electrode. In this way, data of two successive scanning lines of a first field are displayed over the first scanning electrode. During the second field, as shown in FIG. 9(B), the selection timing pulse applied to the first scanning electrode has a duration of 1H, corresponding to one scanning line of the television signal. Thus during the first and second fields of the first frame, three scanning lines of the television signal are displayed by the liquid crystal display elements driven by the first scanning electrode. The operation during the third and fourth fields shown in FIGS. 9(C) and 9(D) is identical to that shown in FIGS. 9(A) and 9(B) and described above, with the exception that the polarities of the selection timing pulses and the signal voltages applied to the signal electrodes are inverted with respect to the polarities shown in FIGS. 9(A) and 9(B), to thereby apply AC drive to the liquid crystal display elements. As shown in FIG. 9(A), the selection timing pulse T2 applied to the second scanning electrode is negative-going and has a duration of 1H during the first field, while during the second field, as shown in FIG. 9(B), selection timing pulse T2 is positive-going for a duration equal to 2H. In this way, two scanning lines of the television signal are displayed over the second scanning electrode during the second field.

As shown in FIGS. 9(A) and 9(B), the pulse widths and polarities of the selection timing pulses T3 and T4 applied to the third and fourth scanning electrodes are respectively identical to those of the selection timing pulses T1 and T2 applied to the first and second scanning electrodes. In this way the pulse width and polarity of the selection timing pulses alternate for successive scanning electrodes, i.e. with selection timing pulses of one polarity and a first pulse width being applied to each of the even-numbered scanning electrodes and selection timing pulses of opposite polarity and a second pulse width being applied to each of the odd-numbered scanning electrodes. This drive method makes it possible to drive 150 rows of display elements of a liquid crystal TV display, as compared with the prior art method described hereinabove whereby only approximately 110 rows of display elements can be utilized. Thus, as for the first embodiment of the present invention described above, display resolution can be improved by a factor of 4/3, by comparison with that prior art method, without the necessity for duplex drive operation or for upper-lower split-display drive operation.

Figure 9:
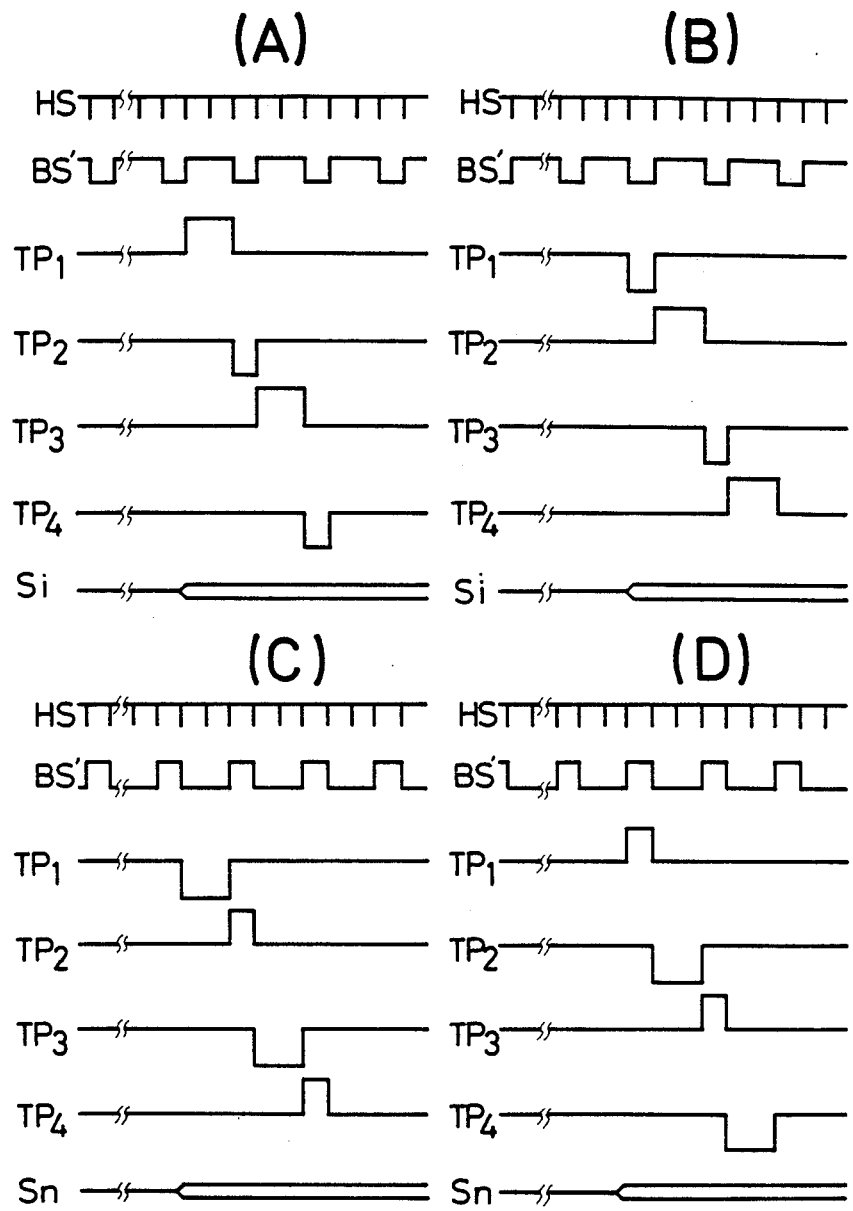
FIG. 9(A) to 9(D) are timing charts for use in describing a second embodiment of the present invention.
Figure 10:
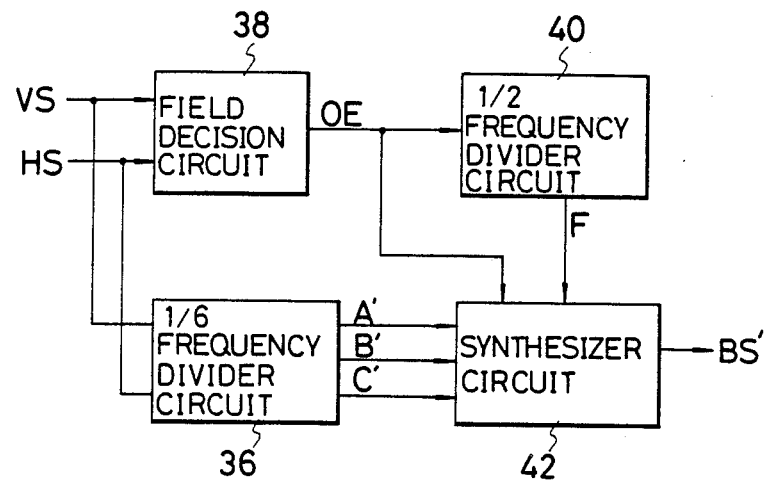
FIG. 10 is a general block diagram of a circuit for generating a base signal employed with the embodiment of FIGS. 9(A) to 9(D)
Figure 11:
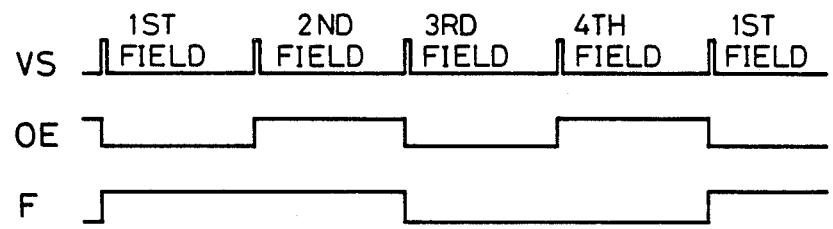
FIG. 11 is a timing chart for the circuit of FIG. 10.

FIG. 10 is a block circuit diagram showing a circuit for generating the base signal BS' shown in FIG. 9. In FIG. 10, VS denotes a vertical sync signal, HS denotes a horizontal sync signal, numeral 36 denotes a 1/6 frequency divider circuit which receives as inputs the signals VS and HS and produces as output a set of 3-phase clock signals A', B' and C'. Numeral 38 denotes a field decision circuit having an identical function to the field decision circuit of the first embodiment, and which produces the field decision signal OE. This signal is input to a ½ frequency divider circuit 38, which divides the frequency of the field decision signal OE by half to produce an output signal F. A synthesizer circuit 42 synthesizes the base signal BS' in response to the output signals A', B', C' from frequency divider circuit 36, signal OE from field decision circuit 38, and output signal F from frequency divider circuit 40. FIG. 11 is a timing diagram showing the waveforms of output signals OE and F of FIG. 10, with respect to that of the vertical sync signal VS. As shown, output signal OE from field decision circuit 38 is at the low logic level during the first field and the third field, and is at the high logic level during the second and fourth fields. Signal F, which is obtained by frequency dividing signal OE by ½, is inverted once in every two successive fields.

Figure 12:
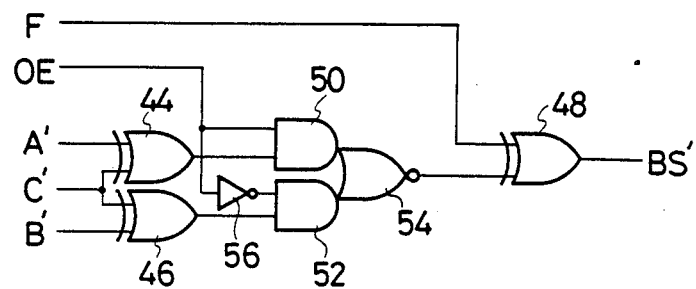
FIG. 12 is a circuit diagram of a signal synthesizing circuit in the circuit of FIG. 10.
Figure 13:
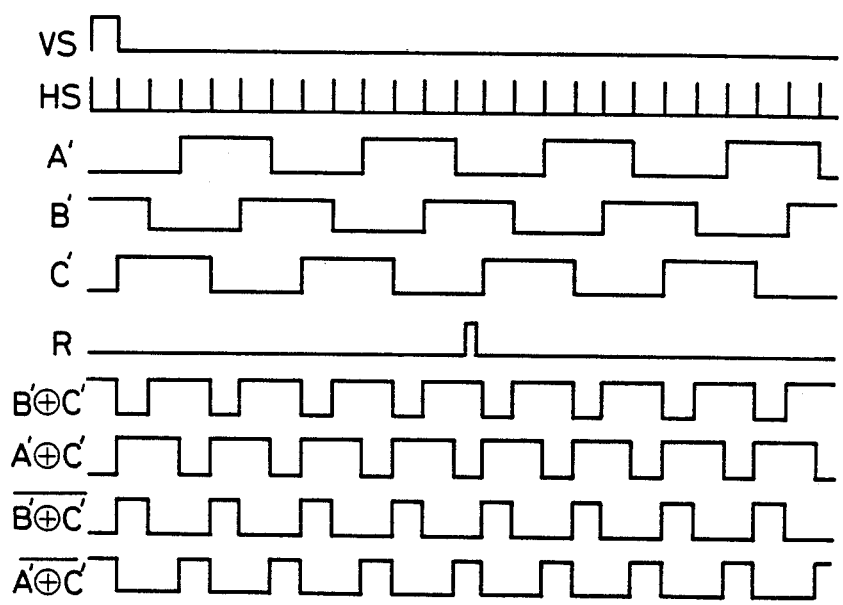
FIG. 13 is a timing chart for describing the operation of the circuit of FIG. 12.

FIG. 12 is a circuit diagram showing a specific embodiment of the synthesizer circuit 42 shown in FIG. 10. Numerals 44, 46 and 48 denote exclusive-OR gates, numerals 50 and 52 denote AND gates, numeral 54 denotes a NOR gate, and 407 an inverter. Signal A' is applied to one input of gate 44, signal B' is applied to one input of gate 46, and signal B' is applied to the other inputs of each of gates 44 and 46. The output from gate 44 is applied to one input of AND gate 50, and the output from gate 46 is applied to one input of AND gate 52. Signal OE is applied directly to the other input of AND gates 50 and is inverted by inverter 407 before being applied to the other input of AND gate 52. The outputs of gates 50 and 52 are applied to the inputs of NOR gate 54. The output from NOR gate 54 is applied to one input of exclusive-OR gate 48, while signal F is applied to the other input of gate 48. The base signal BS' is thereby produced from gate 48, due to the output signal from gate 54 being inverted once in every two fields by signal F. FIG. 13 is a timing chart for illustrating the operation of the synthesizing circuit 42 shown in FIG. 10, in conjunction with the reset signal applied to a scanning electrode drive IC (integrated circuit). In FIG. 13, VS denotes a vertical sync signal, HS a horizontal sync signal. A', B' and C' are the 3-phase output signals from frequency divider circuit 36 described hereinabove. R denotes the reset signal for the scanning electrode drive IC. $\overline{B'} \oplus C'$, $A' \oplus C'$, $\overline{B' \oplus C'}$, and $\overline{A' \oplus C'}$ respectively show the waveform of the output signal BS' from synthesizer circuit 42 during the first, second, third and fourth fields shown in FIG. 11, i.e. the base signal BF waveforms shown in FIGS. 9(A), 9(B), 9(C) and 9(D) respectively.

It can be understood that the operation of this embodiment of the present invention is basically similar to that of the first embodiment described hereinabove, with the difference being that in the case of the second embodiment, no scanning lines are omitted from the display. Referring again to FIG. 4 and assuming the same relationships between the scanning lines and scanning electrodes which were made for the first embodiment, then when the drive method according to the second embodiment is applied, scanning lines SL1 and SL2 will be successively displayed by the row of display elements driven by scanning electrode T3B and then SL3 will be displayed by elements driven by scanning electrode T4B during a first field, while scanning line SL1' will be displayed by the display elements driven by scanning electrode T3B during the second field, and SL2' and SL3' will then be successively displayed by the display elements driven by scanning electrode T4B.

Thus, with the second embodiment, of a total of six scanning lines consisting of three successive scanning lines of one field and three corresponding scanning lines of an immediately succeeding field, three scanning lines will be displayed above one scanning electrode (i.e. will be displayed by the liquid crystal elements driven by that electrode), while the remaining three will be displayed above an immediately adjacent scanning electrode. More specifically, two successive scanning lines of a first field will be displayed over a first scanning electrode, and the succeeding scanning line of that first field will be displayed over a second scanning electrode adjacent to the first scanning electrode, while a first scanning line of a second field will be displayed above the first scanning electrode, and the two succeeding scanning lines of the second field will be displayed above the second scanning electrode.

It should be noted that the drive method of the present invention is equally applicable to black-and-white television displays and to color displays, and is also applicable to PAL and SECAM television standards. The method is also applicable to "active matrix" display panels which employ non-linear resistive elements for individual display element drive control purposes.

It is a further advantage of the drive method of the present invention that a conventional type of liquid crystal TV display drive integrated circuit can be utilized with this method.

Although the present invention has been described in the above with reference to specific embodiments, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. A method of driving a liquid crystal display panel of a television receiver having a plurality of scanning electrodes, for displaying data of a composite video signal with increased resolution by displaying six scanning lines of the video signal by two rows of liquid crystal display elements, whereby of a set of six scanning lines comprising 3 successive scanning lines of a first field of said composite video signal and 3 successive scanning lines of a second field of said composite video signal which coincide with or are displaced by one scanning line pitch from said 3 successive scanning lines of the first field in one frame of said composite video signal, 3 lines of said six set of scanning lines are displayed by liquid crystal display elements driven by a first one of said scanning electrodes and the remaining three lines of said set of six scanning lines are displayed by liquid crystal display elements driven by a second one of said scanning electrodes.

2. A drive method according to claim 1, whereby one of said 3 scanning lines to be scanned by said first scanning electrode during said first field is omitted from being displayed and whereby one of said remaining 3 scanning lines of said set of six scanning lines is omitted from being displayed.

3. A method of driving a liquid crystal display panel of a television receiver having a plurality of scanning electrodes, for displaying data of a composite video signal, whereby of a set of 6 scanning lines comprising 3 successive scanning lines of a first field of a television signal and 3 successive scanning lines of a second field which coincide with or are displaced by one scanning line pitch from said 3 successive scanning lines of the first field, in one frame of said composite video signal, at least two and not more than three lines of said set of 6 scanning lines are displayed by each of two rows of liquid crystal display elements driven by a first and a second one of said plurality of scanning electrodes respectively.

4. A drive method according to claim 3 in which sampling of said television signal is performed whereby only an odd-numbered one of said 3 successice scanning lines of the first field and an odd-numbered one of said 3 successive scanning lines of the second field are displayed by said liquid crystal display elements driven by said first scanning electrode, and only the remaining odd-numbered one of said 3 successive scanning lines of the first field and an even-numbered one of said 3 successive scanning lines of the second field are displayed by said liquid crystal display elements driven by said second scanning electrode.

* * * * *